(12) United States Patent
Browning et al.

(10) Patent No.: US 10,532,232 B2
(45) Date of Patent: Jan. 14, 2020

(54) SYSTEMS, APPARATUS, AND METHODS FOR SAFETY EQUIPMENT DEPLOYMENT FROM A DRONE

(71) Applicant: Intel Corporation, Santa Clara, CA (US)

(72) Inventors: David W. Browning, Portland, OR (US); Kevin J. Doran, North Plains, OR (US); Subramanian Anandaraj, Chandler, AZ (US); Songnan Yang, San Jose, CA (US); Bradley A. Jackson, Hillsboro, OR (US); Shashi Jain, Hillsboro, OR (US); Venkata Rakesh Seethamsetty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 15/843,271

(22) Filed: Dec. 15, 2017

(65) Prior Publication Data
US 2019/0046816 A1    Feb. 14, 2019

(51) Int. Cl.
A62B 1/00     (2006.01)
B64C 39/02    (2006.01)
G05B 19/042   (2006.01)

(52) U.S. Cl.
CPC .............. *A62B 1/00* (2013.01); *B64C 39/024* (2013.01); *G05B 19/0428* (2013.01); *B64C 2201/128* (2013.01); *B64C 2201/141* (2013.01)

(58) Field of Classification Search
CPC ........... A62B 1/00; A62B 1/18; B64C 39/024; G05B 19/0428
See application file for complete search history.

(56) References Cited

U.S. PATENT DOCUMENTS

| | | | |
|---|---|---|---|
| 2010/0044156 A1* | 2/2010 | Tkebuchava | B64D 1/22 182/231 |
| 2014/0111332 A1* | 4/2014 | Przybylko | G06Q 10/00 340/539.1 |
| 2015/0166176 A1* | 6/2015 | Hester, Jr. | B64C 39/024 244/17.11 |
| 2016/0340006 A1* | 11/2016 | Tang | B63C 9/01 |
| 2017/0247110 A1* | 8/2017 | Chappell | B64C 39/024 |
| 2017/0369169 A1* | 12/2017 | Lee | B64D 5/00 |
| 2018/0005012 A1* | 1/2018 | Aycock | G02B 5/201 |
| 2018/0039262 A1* | 2/2018 | Fox | G01S 19/51 |
| 2018/0107210 A1* | 4/2018 | Harnett | G05D 1/0038 |
| 2018/0190042 A1* | 7/2018 | Gordon | G07C 5/008 |

* cited by examiner

*Primary Examiner* — Vincent H Tran
(74) *Attorney, Agent, or Firm* — Hanley, Flight and Zimmerman, LLC

(57) ABSTRACT

Systems, apparatus, and methods to deploy safety equipment from a drone are disclosed. An example apparatus includes a sensor to gather environmental data and an analyzer in communication with the sensor. In this example, the analyzer is to identify an anchor site based on the environmental data and produce an assessment of stability of the anchor site based on the environmental data and model data. The example apparatus also includes one or more actuators to deploy a securing device in response to the assessment of the analyzer indicating the anchor site is stable and to deploy the safety equipment.

25 Claims, 5 Drawing Sheets

SYSTEMS, APPARATUS, AND METHODS FOR SAFETY EQUIPMENT DEPLOYMENT FROM A DRONE

FIELD OF THE DISCLOSURE

This disclosure relates generally to drones, and, more particularly, to systems, apparatus, and methods for safety equipment deployment from a drone.

BACKGROUND

Current emergency response services rely on the skills and speed of human emergency responders. Thus, rescuing a victim in an emergency situation where response time is critical is prone to latency issues.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
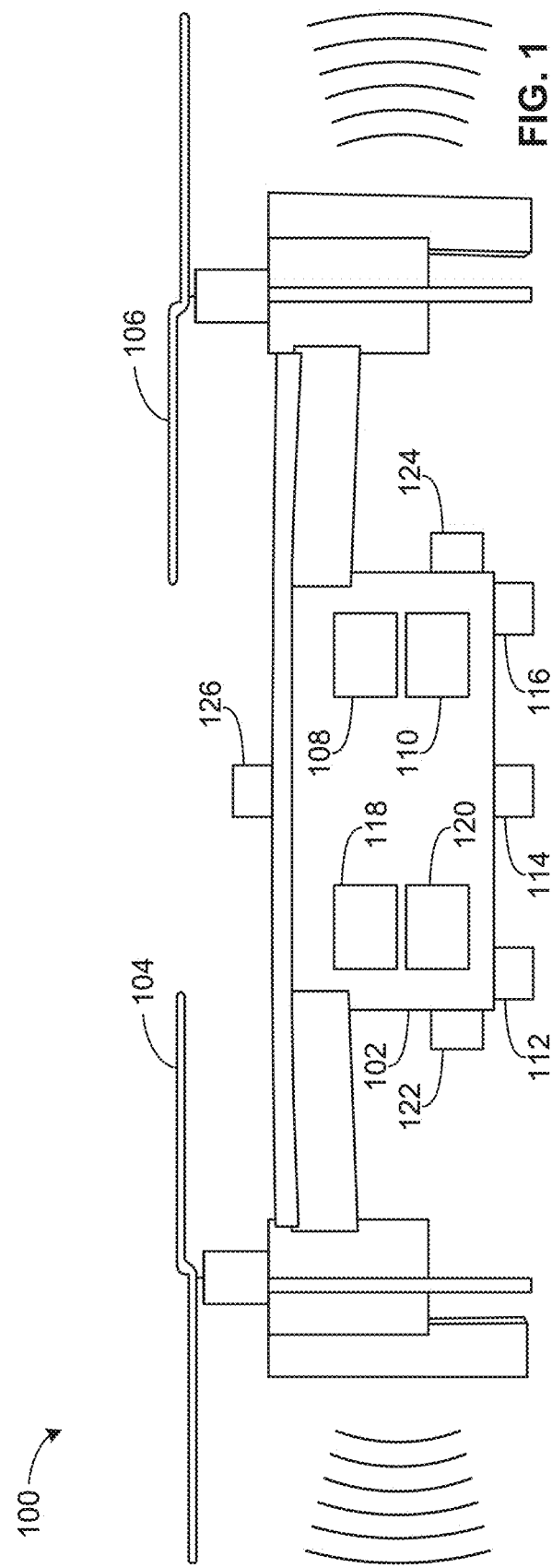
FIG. 1 is a schematic illustration of an example drone in accordance with the teachings of this disclosure.

Rescuing victims from a burning building or in other emergencies situations currently involves humans delivering the proper safety equipment to the emergency scene. Human skill is used to deploy the safety equipment and frequently, for example in low-visibility environments, some amount of guesswork is employed for the emergency responders to ascertain the emergency assistance that is needed.

Disclosed herein are advancements to emergency response models. An example drone disclosed herein can operate autonomously and with low latency to assess an emergency situation, identify victims, and deliver aid including the deployment of safety equipment. The mobile autonomous drones disclosed herein combine sensor technology and processing algorithms to assess emergency situations including identification of anchoring sites at which the drone can deploy a grappling hook or other anchor or securing device to secure the drone to, for example, a portion of a building. Once secured, the drone may be used to deploy safety equipment including, for examples, a harness and steel or other cables for rescuing a victim, a rope, a hook, a ladder, a raft, a life vest, an automated external defibrillator (AED), etc.

For example, the drone can be deployed to a burning building in which there are victims trapped on the roof. The drone can use the sensor data to identify a girder that is of solid and sound structure (e.g., not compromised by heat). The drone can deploy an anchor or securing device such as, for example, a grappling hook to wrap around the girder. The drone also can deploy a rope or ladder for use by the victims to descend from the roof and escape danger.

In some examples, the drone can also identify one or more victims, even in smoky or otherwise low-visibility environments, and use the sensor data to distinguish between people and objects. Thus, the drone can avoid attempting to anchor to one of the victims. The drone can also use data related to victim identification and victim location to accurate deploy a safety apparatus near the victim. For example, a victim could be struggling in a body of water, and the drone can deploy a life preserver or safety raft near the victim. The accuracy of the deployment of the safety equipment near the victim could be particularly helpful where the victim has a reduced level of consciousness such as, for example, from hypothermia.

In some examples, the drone itself becomes the securing mechanism for deployment of the safety equipment. For example, the drone may not be able to identify any portion of a building sound enough for anchoring a grappling hook. In some examples, the drone can embed or otherwise install itself on or to the building and become the securing mechanism. For example, the drone can be deployed to a burning building in which there are victims trapped on the roof. The drone can use the sensor data to determine that there is no good area or solid structure about which the drone can wrap an anchoring device. In this example, the drone can land on the roof and embed or install itself on the roof. The drone may be secured to the roof via deployment of projectiles, for example, that embed into the roof, or by the weight of the drone itself. The drone becomes the securing device and can deploy a rope therefrom. The victims can use the rope, secured by the weight of drone, to descend from the roof and escape danger.

Thus, in the examples disclosed herein, the drone can quickly, accurately, and safely deploy safety equipment in clear and low-visibility environments.

FIG. 1 is a schematic illustration of an example drone 100 in accordance with the teachings of this disclosure. The example drone 100 disclosed herein is a quadcopter drone (viewed from the side in FIG. 1). However, the teachings of this disclosure are applicable to drones, also referred to as unmanned aerial vehicles (UAVs), with any number of rotors or propellers. The teachings of this disclosure are also applicable to fixed wing drones. The example drone 100 includes a body 102 and, in the view of FIG. 1, an example first set of rotors 104 and an example second set of rotors 106. The body 102 houses and/or carries additional components used in the operation of the drone 100. For example, the body 102 houses an example motor 108 and an example motor controller 110. The motor controller 110 controls the motor 108 to rotate the rotors 104, 106.

The example drone 100 includes a plurality of sensors to gather data from the environment. For example, the drone 100 includes a visual sensor 112. The visual sensor 112 may be, for example, a camera. In some examples, such as for example in low-visibility environments, a laser-based sensor may be used to provide the visual data. For example, the visual sensor 112 may include a laser imaging video camera. The laser imaging video camera sends out fast pulses of laser light and then opens a gate to receive the light after the light is reflected off of an object. The laser light penetrates smoke and fire and allows the laser imaging video camera to gather and present data of objects otherwise obscured by the smoke and/or behind flames of a fire.

The drone 100 also includes a thermal imaging sensor 114. The thermal imaging sensor 114 may be, for example, a thermal imaging camera, an infra-red sensor, etc. In addition, the drone 100 includes an electromagnetic radiation sensor 116. The electromagnetic radiation sensor 116 may include, for example, millimeter-based wave sensors such as, for example, a millimeter wave scanner. Additionally or alternatively, in some examples the electromagnetic radiation sensor 116 includes x-ray sensors such as, for example, a backscatter x-ray scanner.

In some examples there may be a plurality of one or more of the visual sensor 112, thermal imaging sensor 114, and/or electromagnetic radiation sensor 116. Also, in some examples, one or more other types of sensors or combination of sensors maybe used to gather environmental data including, for example, an audio sensor such as a microphone, a wind gauge, a temperature sensor such as a thermometer, etc.

To process the signals and data gathered from the visual sensor 112, thermal imaging sensor 114, and/or electromagnetic radiation sensor 116, the example drone 100 includes an example situational assessment module 118. The situational assessment module 118, as disclosed in greater detail below, processes environmental data, which includes the signals and data gathered from the visual sensor 112, thermal imaging sensor 114, and/or electromagnetic radiation sensor 116. As detailed below, the environmental data is used to identify victims and to assess the stability or instability of structures in the environment for identification of anchoring sites and/or installation points for the drone 100.

The example drone 100 also includes an actuator 120 that is used to deploy an anchor or a securing device 122. As disclosed in greater detail below, in some examples, the securing device 122 is an anchor to wrap around a structure to secure the drone 100 to a building and/or a projectile to secure the drone to the building. The actuator 120 can also deploy a payload 124. The payload 124, as disclosed herein, includes safety equipment for use in rescuing or otherwise aiding a victim. While one actuator 120 is shown for deploying the securing device 122 and the payload 124, in some examples, two or more actuators may also be used for deploying the securing device 122 and/or the payload 124.

The example drone 100 also includes an example transmitter 126. The transmitter 126 may be used to communicate the environmental data and/or processed or semi-processed data. In addition, the transmitter 126 may be used to communicate to other drones.

Figure 2:
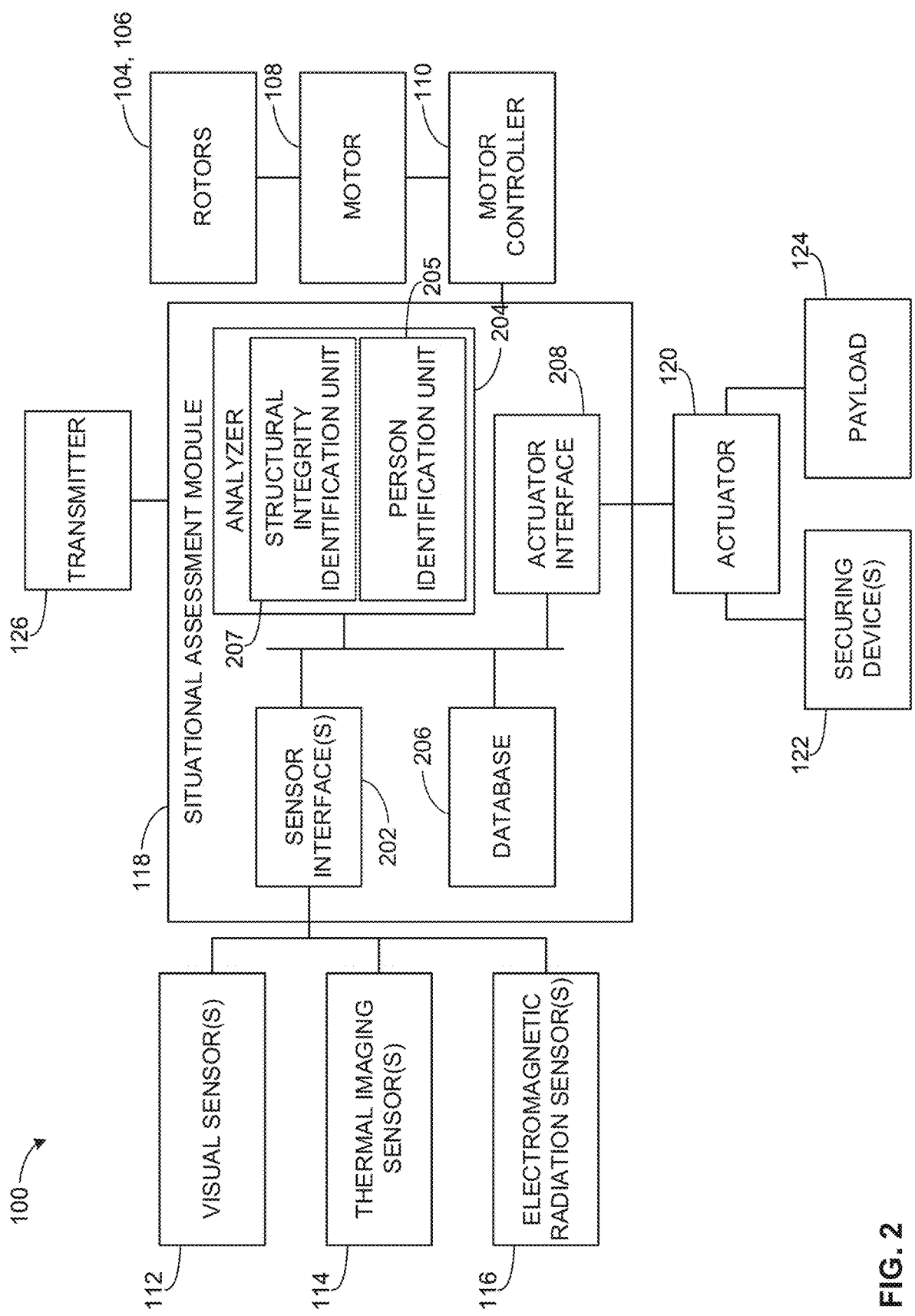
FIG. 2 is a block diagram of the example drone of FIG. 1 with an example situational assessment module.

FIG. 2 is a block diagram of the example drone 100 of FIG. 1, which includes the example situational assessment module 118 to implement the analysis of the environment surrounding the drone 100. As shown in FIG. 2, the example drone 100 includes means for propelling the drone including, for example, the rotors 104, 106, the motor 108, and the motor controller 110. The example drone 100 also includes means for gathering environmental data including, for example, the visual sensors 112, the thermal imaging sensors 114, and the electromagnetic radiation sensors 116. The environmental data gathered from the visual sensors 112, the thermal imaging sensors 114, the electromagnetic radiation sensors 116 are input into the situational assessment module 118 via one or more sensor interfaces 202.

The situational assessment module 118 also includes means for processing the data including, for example, an example analyzer 204 that processes the environmental data, model data related to physical properties of building materials, operational data of the drone 100, and/or other data as disclosed herein. The analyzer 204 may include, for example, machine readable instructions and one or more processors including, for example, the processor 412 of FIG. 4. In addition, the analyzer 204 forms means for identifying victims, anchor sites, and/or installation sites and means for assessing the stability or instability of structural elements of building or other structures in the environment as disclosed herein. The data is stored in and retrieved from an example database 206. The example drone 100 also includes one or more actuator interface(s) 208 that is used to communicate operational signals to the actuator 120, or multiple actuators, for the deployment of the securing devices 122 and/or the payload 124 as disclosed in further detail below.

Figure 4:
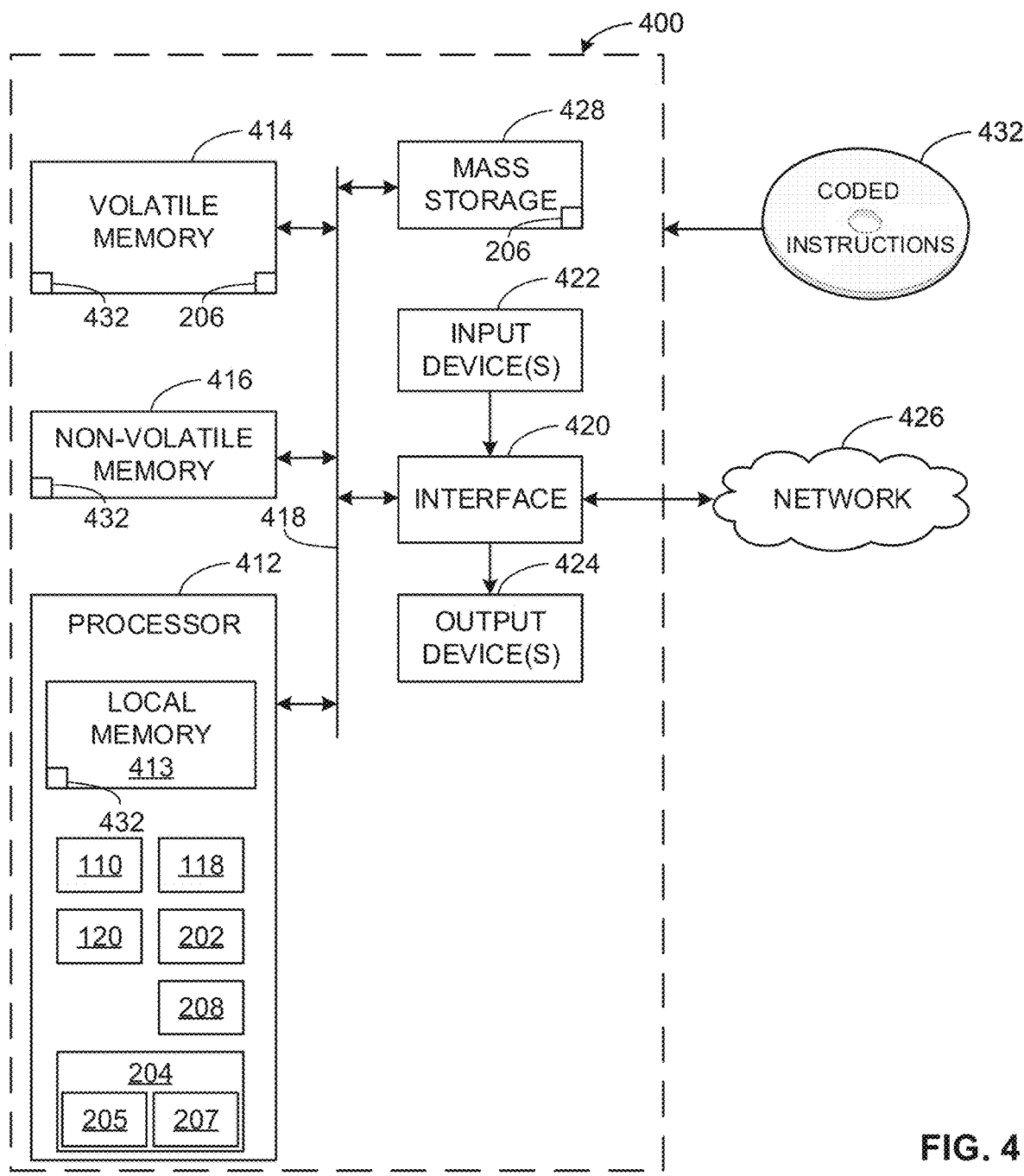
FIG. 4 is a block diagram of an example processor platform structured to execute the example machine readable instructions of FIGS. 3A and 3B to implement the example audio noise reduction system of FIG. 2.

The example drone 100 also includes means for communicating data within the drone 100 including, for example, the sensor interfaces 202, actuator interfaces 208, and/or a processing platform 400 of FIG. 4. The example drone 100 also include means for communicating data to and/or from the drone 100 including, for example, the transmitter 126.

The drone 100 is preprogrammed with both the number and types of sensors carried by the drone 100. For example, the example drone 100 includes the visual sensors 112, the thermal imaging sensors 114, and the electromagnetic radiation sensors 116. The example drone 100 is also preprogrammed to know what type of securing devices 122 and payload 124 are carried by the drone 100. The preprogramming could occur wirelessly (e.g., via the transmitter 126) or via a wired connection.

During operation, the drone 100 may be deployed to an emergency situation such as, for example, a burning building, to rescue or otherwise provide aid to victims. When at the emergency scene, the drone 100 identifies the victims and determines where to anchor before deploying the safety equipment. To identify the victims, the drone 100 uses environmental data gathered from one or more of the visual sensors 112, the thermal imaging sensors 114, and/or the electromagnetic radiation sensors 116, which is input into the situational assessment module 118 via the sensor interface 202. The analyzer 204 includes a person identification unit 205 that processes the environmental data to detect the victims. For example, the analyzer 204 can use infrared data to distinguish between living beings and inanimate objects. Visual data from cameras can also be used to detect movement.

In addition, in some examples, preprogrammed body profiles may be stored in the database 206 and accessed by person identification unit 205 of the analyzer 204 for comparison with visual data gathered from the environment. The analyzer 204 can determine shapes in the environment and compare those shapes to the body profiles. If a shape in the environment matches or substantially matches one of the preprogrammed body profiles, the analyzer 204 determines that the shape in the environment is a person. Preprogrammed body profiles may be helpful for victim identification where the victim is unconscious and, therefore, not moving.

Also, in some examples, video, thermal imaging and/or other data is transmitted (via the transmitter 126 for example) to an emergency responder. In some examples the transmission is a live feed or streaming data. The emergency responder can assist in victim identification based on the environmental data. With victims identified, the drone 100 avoids attempting to anchor to locations at or near the identified victims. This enhances safety and decreases the chances a victim is hit with a securing device 122. Unclassifiable shapes or objects are also avoided as potential anchor sites. Victim identification also informs the drone 100 as to appropriate locations for deployment of the payload 124. For example, in the water emergency situation described above, the drone 100 can identify the victim from the environmental data and deploy a safety raft or life preserver near the victim.

The analyzer 204 of the drone 100 also includes a structural integrity identification unit 207 that is used to analyze the environmental data to assess the soundness of structures in the environment to distinguish stable structures from unstable structures. The soundness or stability is used by the analyzer 204 to identify anchor sites to secure the drone 100. In the assessment, the structural integrity identification unit 207 of the analyzer 204 also accesses model data related to known structural or other physical or mechanical properties of building materials that is stored in the database 206.

In one example, the environmental data gathered by the drone 100 includes the visual data from the visual sensor(s) 112 that is used to determine the stability of one or more structures in the environment including, for examples, structures related to buildings. Buildings are generally a composite of interconnected solid, skeleton, and shell-based structures. These structures and associated shapes work together to withstand internal and external forces such as, for example, gravity, wind, heat, movements, etc. Due to these functions, the structures often have a large volume in order to withstand the significant, primary forces of weight shear.

The analyzer 204 can identify structures in the environmental data including, for example, chimneys, rafters, girders, poles, and/or other structures that may be used, for example, as potential anchor sites. The analyzer 204 can also identify the material of the structures from the visual data including, for example, concrete, brick, metal, wood, etc. The size and shape of the structures can also be determined from the visual data. Also, some structures have predefined shapes, sizes, and mechanical or physical properties and associated degrees of solidity that can be stored as the model data in the database 206. The visual data and/or the model data is used to identify stable areas including potential hookable areas or anchor sites. For example, the analyzer 204, using the structural integrity identification unit 207, can determine from the visual data if a structure has a shape and/or size that can accept or otherwise support the securing device 122. For example, a pole or a girder would be able to support a grappling hook wrapped therearound. The analyzer 204, using the structural integrity identification unit 207, can also determine based on the model data if the structure would support the securing device 122. For example, a steel beam could support a grappling hook whereas a small, thin wall-mounted angled flag pole may not.

The thermal imaging sensor(s) 114 and/or electromagnetic radiation sensor(s) 116 also provide environmental data used to assess the stability of structures. The structural integrity identification unit 207 of the analyzer 204 processes the environmental data from the electromagnetic radiation sensor(s) 116 to determine structural properties including, for example, if a structure is hollow, the size of the structure, and/or the shape of the structure. For example, an x-ray sensor can provide data that its waves could not propagate through a steel girder and that the girder is of a specific size. In some examples, the drone 100 flies around a potential anchor site or structure of interest 360 degrees or flies at least partially around the potential anchor site or structure of interest to gather a sufficient amount of data to determine size and shape.

The thermal imaging sensor(s) 114 gather environmental data related to temperatures of structures in the environment. The structural integrity identification unit 207 of the analyzer 204 processes the temperature data to determine if the temperature of a structure is below a threshold temperature. Temperature data can be used to determine if heat or other stresses have compromised the structural integrity of a structure. The threshold temperature data can be stored as the model data in the database 206. Different materials may have different temperature thresholds related to temperatures at which the materials transition from structurally sound or stable to structurally unsound or unstable.

In some situations, the situational assessment module 118 will investigate and analyze the stability of multiple structures. In some examples multiple structures are investigated to compare which structure would be the most stable anchor site. In some examples, multiple structures are investigated because one or more of the investigated structures are determined to be unstable. When the analyzer 204, using the structural integrity identification unit 207, determines a structure to be stable and the structure is selected as an anchor site the actuator 120 receives instructions via the actuator interface 208 to deploy the securing device 122. For example, the analyzer 204 may identify a steel girder as the anchor site and send a signal to the actuator 120 via the actuator interface 208 to deploy a grappling hook, which is shot from the drone 100 and wraps around the girder. With the grappling hook or other securing device(s) 122 in place, the drone 100 is anchored.

In some examples, there is a secondary stability test. For example, the situational assessment module 118 can test to assure that the securing device 122 is anchored securely. This may be accomplished by pulling against the anchor point. For example, the drone 100 can thrust upward to test the stability of the securing device 122. The stability of the anchor connection can be determined, for example, by measuring the distance the drone 100 can move while pulling, measuring resistance preventing movement of the drone 100, and/or analyzing visual data related to the anchor. In other examples, the stability of the securing device 122 connected at the anchor site is tested via ground or land-based means. For example, a cable winch mounted to a fire truck or other vehicle for stability or a stationary winch positioned on the ground can pull an amount of tension on the securing device 122 to test the anchor connection and assure soundness and stability.

When the securing device 122 is soundly anchored, the situational assessment module 188 can send instructions to the actuator 120 via the actuator interface 208 to deploy the payload 124. For example, a drone 100 secured to an anchor point at a burning building can deploy a payload 124 including a safety harness and cable to enable victims to descend from the building. In some examples, the drone 100 itself does not stay coupled to the anchor site. Rather, in such examples, the drone 100 may deploy the securing device 122, which is securely coupled to the anchor site and also released from the drone 100. For example, the drone 100 may deploy a grappling hook that wraps around the anchor site and is released from the drone 100. In this example, the grappling hook is secured to the anchor site and includes a safety cable trailing behind, which is usable by the victims to descend from the building.

Different drones may carry different payloads for different emergency situations. In addition, in some examples, drones may carry multiple types of payloads. Different payloads include the harness and cable noted above in which there may be different sized cables depending on the weight of the victim. Other payloads include one or more of a rope, a ladder, pitons, a life vest, a life raft, a life preserver, a hook, an AED, prescription medicine, drinking water, first aid kits, a parachute, and/or other desired safety, medical, rescue and/or emergency equipment. Information related to the payload 124 and other features of the drone 100 are stored and accessed from the database 206. This information, and other data disclosed herein, is usable by the drone 100 to inform operating procedures, parameters and/or capabilities.

In some examples, the situational assessment module 118 does not identify a stable anchor site. In such examples, the drone 100 has the ability to become the anchoring site itself. That is, the drone 100 becomes the stable, solid object used for anchoring. In one example, the analyzer 204 uses the environmental data to identify soft areas that may be used as installation points. For example, the analyzer 204 can use environmental data from the visual sensor 112 to identify a flat portion of a roof of a building as an installation point on which the drone 100 can land.

Different means can be used to secure the drone to the installation point. For example, the drone 100 can be secured to the building via projectiles that shoot out, for example, from guns, and embed into the installation point. In some examples, the projectiles are deployed from pneumatic pistons. In some examples, one or more pyramid-type wedges are used for securing the drone to the installation point. In some examples, the drone 100 is coupled to the installation point via hooks with barbs that prevent or impede release of the hooks from the installation point. In some examples the drone 100 is a missile-type structure that embeds itself into the installation point. In some examples, the drone 100 includes uses a grappling hook to secure itself, as disclosed above. Also, in some examples, the drone 100 includes a plurality of grabbers or other connection mechanisms such as, for example, hooks, clamps, and/or other fasteners or combination of fasteners that latch onto or otherwise secure the drone 100 to any object the grabbers can reach or contact. In some examples, the grabbers are activated by a contact switch. There may be six grabbers, eight grabbers, or any other suitable number of grabbers including, for example, one. In some examples, the drone 100 includes solid-fuel boosters to achieve greater speed prior to installation for any installation means. Also, in some examples, the drone 100 is stable at the installation point by the weight of the drone 100 alone.

In another example in which the drone 100 itself is the stable, solid object, the drone 100 does not land or otherwise become installed at the installation point. Rather, in this example, the drone 100 is a high-thrust drone that can deploy the payload 124 such as a harness and cable, which is then secured to a victim. With the victim secure, the drone 100 can lift the victim from the emergency situation.

Similar to the examples disclosed above in which the drone 100 secures securing device(s) 122 to an anchor site, when the drone 100 itself is the solid object, a secondary test of stability may be performed. With the secondary test, the analyzer 204 can determine the stability of the drone 100 at the installation point in the same manner as disclosed above.

In some examples, not all of the sensors 112, 114, 116, securing devices 122, and/or payload 124 need to be coupled to the drone 100. There may be multiple drones working in tandem or otherwise in coordination. For example, one or more of the drones can gather environmental data and different one or more drone can deliver a payload. Different drones may carry different types or portions of a securing device or a payload. The drones may communicate wirelessly through their respective transmitters 126. Also, the drones may communicate with a central processing center, which in some examples is land based. The drones can send raw data or processed data to the central processing center and/or to each other.

In some examples, operation of the drone 100 also considers other factors such as, for example, the weight of the drone and/or other physical properties may be considered by the analyzer 204 when determining, for example, if the drone 100 is too heavy to land. Data related to the operational history and/or capability of the drone 100 including, for example, flight time may be considered by the analyzer 204 when determining, for example, if the drone 100 can land or hover and make a return flight. Also, data such as for example, drone thrust capabilities may also be processed by the analyzer 204. Thrust can be defined in accordance with Equation 1, with the variables of air density ($\rho$), rotor area (A), and air velocity (v).

$$F_{thrust} = (\rho A v^2)/2 \quad \text{Equation (1)}$$

Rotor speed and pitch may also be considered. These factors are considered by the analyzer 204 when determining, for example, if the drone 100 is capable of lifting a victim from a building, if the drone 100 can maintain positioning of the securing device 122 long enough to effect a rescue, etc.

While an example manner of implementing the drone 100 of FIG. 1 is illustrated in FIG. 2, one or more of the elements, processes and/or devices illustrated in FIG. 2 may be combined, divided, re-arranged, omitted, eliminated and/or implemented in any other way. Further, the example motor controller 110, the example visual sensors 112, the example thermal imaging sensors 114, the example electromagnetic radiation sensors 116, the example actuator 120, the example transmitter 126, the example sensor interfaces 202, the example analyzer 204, the example person identification unit 205, the example database 206, the example structural integrity identification unit 207, the example actuator interfaces 208 and/or, more generally, the example situational assessment module 118 of FIG. 2 may be implemented by hardware, software, firmware and/or any combination of hardware, software and/or firmware. Thus, for example, any of the example motor controller 110, the example visual sensors 112, the example thermal imaging sensors 114, the example electromagnetic radiation sensors 116, the example actuator 120, the example transmitter 126, the example sensor interfaces 202, the example analyzer 204, the example person identification unit 205, the example database 206, the example structural integrity identification unit 207, the example actuator interfaces 208 and/or, more generally, the example situational assessment module 118 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example motor controller 110, the example visual sensors 112, the example thermal imaging sensors 114, the example electromagnetic radiation sensors 116, the example actuator 120, the example transmitter 126, the example sensor interfaces 202, the example analyzer 204, the example person identification unit 205, the example database 206, the example structural integrity identification unit 207, the example actuator interfaces 208 and/or the example situational assessment module 118 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example drone 100 of FIG. 1 may include one or more elements, processes and/or devices in addition to, or instead of, those illustrated in FIG. 2, and/or may include more than one of any or all of the illustrated elements, processes and devices.

Figure 3A:
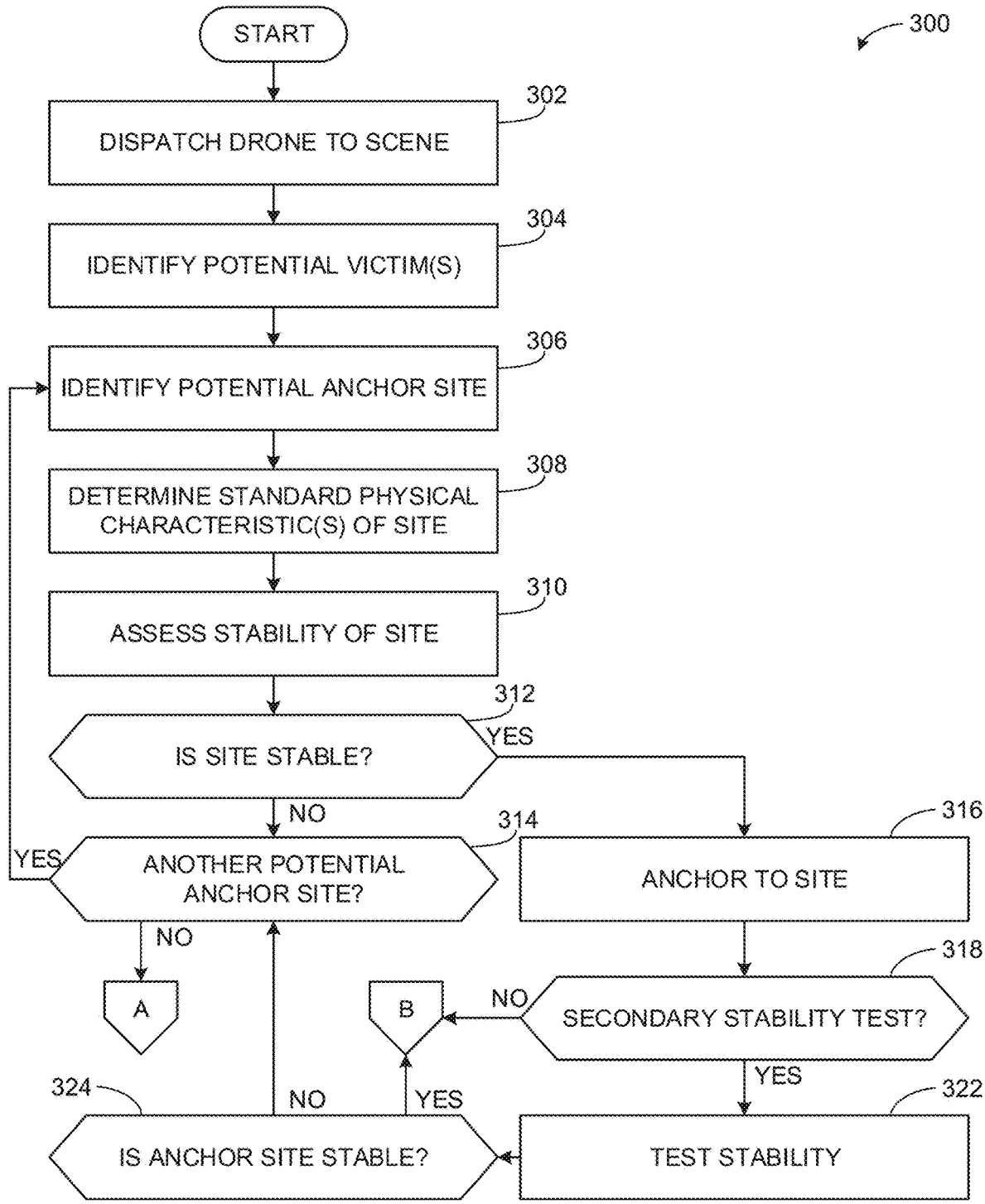
FIGS. 3A and 3B is a flow chart representative of example machine readable instructions that may be executed by one or more processors to implement the drone of FIG. 1.
Figure 3B:
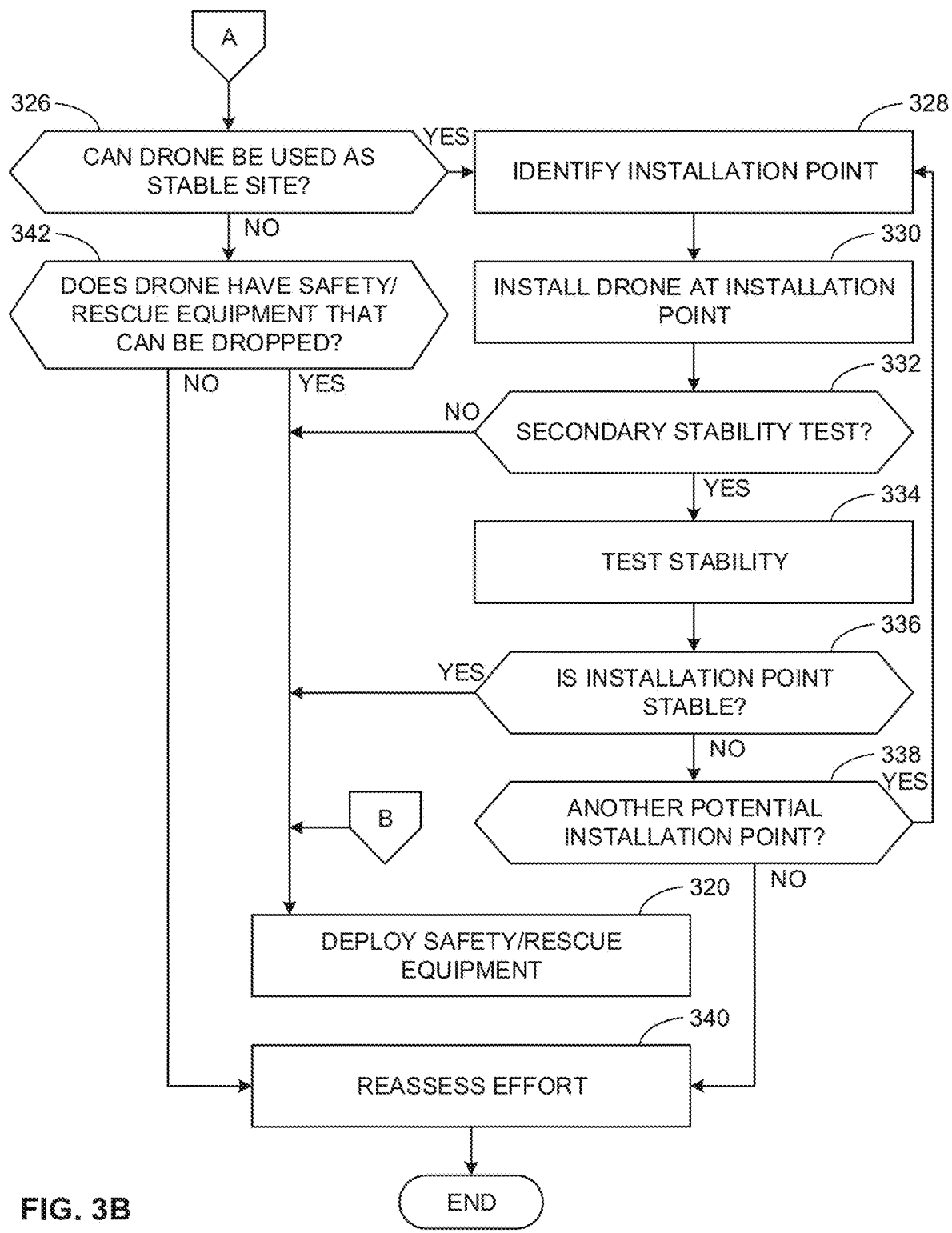

A flowchart representative of example machine readable instructions for implementing the drone 100 of FIGS. 1 and 2 is shown in FIGS. 3A and 3B. In this example, the machine readable instructions comprise a process or program 300 for execution by a processor such as the processor 412 shown in the example processor platform 400 discussed below in connection with FIG. 4. The program 300 may be embodied in software stored on a non-transitory computer readable storage medium such as a CD-ROM, a floppy disk, a hard drive, a digital versatile disk (DVD), a Blu-ray disk, or a memory associated with the processor 412, but the entire program 300 and/or parts thereof could alternatively be executed by a device other than the processor 412 and/or embodied in firmware or dedicated hardware. Further, although the example program 300 is described with reference to the flowchart illustrated in FIGS. 3A and 3B, many other methods of implementing the example drone 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example program 300 of FIGS. 3A and 3B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example program 300 of FIGS. 3A and 3B begins with the drone 100 being dispatched to a scene such as, for example, a building on fire or other emergency situation (block 302). The analyzer 204, using the person identification unit 205, analyzes environmental data including one or more of visual data gathered from one or more visual sensors 112, thermal imaging data from one or more thermal imaging sensors 114, electromagnetic radiation data from one or more electromagnetic radiation sensor 116 and/or other data as disclosed herein to identify one or more potential victims (block 304). In some examples, the analyzer 204 also identifies the one or more potential victims (block 304) using preprogrammed body profiles stored in the database 206.

The analyzer 204, using the structural integrity identification unit 207, also uses the environmental data to identify one or more potential anchor sites to which the drone 100 can be secured to the building (block 306). For example, the analyzer 304 can use visual data from the visuals sensors 112 to identify a steel girder, chimney, and/or other structure about which the drone 100 can anchor. The analyzer 204 also accesses model data from the database 206 to determine one or more standard physical characteristics of at least one of the potential anchor sites (block 308). The standard physical characteristics include, for example, one or more mechanical properties of one or more building materials. The analyzer 204 analyzes the environmental data and the model data to assess the stability of the anchor site (block 310) and to determine if the site is stable (block 312). If the analyzer 204 determines that a potential anchor site is not stable (block 312), the situational assessment module 118 determines if the analyzer 204 should assess other potential anchor sites (block 314). If other potential anchor sites are to be assessed by the analyzer 204, the analyzer 204 then continues and identifies one or more other potential anchor sites (block 306).

If the analyzer 204 has determined that the anchor site is stable (block 312), the situational assessment module 118 sends an instructional signal to the actuator 120 via the actuator interface 208 to deploy one or more securing devices 122 to anchor the drone 100 to the site (block 316).

When the drone 100 is anchored to the anchor site, the situational assessment module 118 determines if the stability of the attachment of the drone 100 to the anchor site should be tested via a second stability test (block 318). If the situational assessment module 118 determines that a second stability test is not needed (block 318), the situational assessment module 118 sends an instructional signal to the actuator 120 via the actuator interface 208 to deploy safety and/or rescue equipment and/or other payload 124 (block 320). For example, if the drone 100 is sent to an emergency situation to position a ladder and would not be used to hold a cable that will support the weight of a victim, the situational assessment module 118 may determine that the coupling of the drone 100 to the anchor site is sufficient for the purposes of deploying the payload of a ladder and a secondary stability test is not needed.

If the situational assessment module 118 determines that the secondary stability test is needed (block 318), the analyzer 204 conducts the stability test (block 322) to assure that drone 100 is anchored securely. The stability may be tested by pulling against the anchor point using, for example, drone thrust or a land-based winch, as disclosed above. The analyzer 204 determines if the anchor site is stable (block 324). If the anchor site is stable, the situational assessment module 118 sends an instructional signal to the actuator 120 via the actuator interface 208 to deploy safety and/or rescue equipment and/or other payload 124 (block 320).

If the analyzer 204 determines that the anchor site is not stable after the secondary test (block 324), the situational assessment module 118 determines if the analyzer 204 should assess other potential anchor sites (block 314). If other potential anchor sites are to be assessed by the analyzer 204, the analyzer 204 continues and identifies one or more other potential anchor sites (block 306).

If the situational assessment module 118 determines that the analyzer 204 should not assess other potential anchor sites (block 314), the situational assessment module 118 determines if the drone 100 itself can be used as the stable site (block 326).

When investigating use of the drone 100 itself as the stable site, the analyzer 204 processes the environmental data gathered from one or more of the sensors 112, 114, 116 to identify an installation point (block 328). For example, the analyzer 204 can identify a relatively soft point of a roof based on millimeter wave scanner data gathered from the electromagnetic radiation sensor 116. The situational assessment module 118 sends an instructional signal to the actuator 120 to deploy securing devices 122 such as, for example, projectiles shot from the drone 100 that embed into the roof to install the drone 100 at the installation point (block 330).

When the drone 100 is installed at the installation point, the situational assessment module 118 determines if the stability of the attachment of the drone 100 to the installation point should be tested via a second stability test (block 332). If the situational assessment module 118 determines that a second stability test is not needed (block 332), the situational assessment module 118 sends an instructional signal to the actuator 120 via the actuator interface 208 to deploy safety and/or rescue equipment and/or other payload 124 (block 320).

If the situational assessment module 118 determines that the secondary stability test is needed (block 332), the analyzer 204 conducts the stability test (block 334) to assure that the drone is installed securely. The stability may be tested by pulling against a deployed securing device using, for example, a land-based winch, as disclosed above. The analyzer 204 determines if the drone 100 is installed securely and the installation point is stable (block 336). If the installation point is stable, the situational assessment module 118 sends an instructional signal to the actuator 120 via the actuator interface 208 to deploy safety and/or rescue equipment and/or other payload 124 (block 320).

If the analyzer 204 determines that the installation point is not stable after the secondary test (block 336), the situational assessment module 118 determines if the analyzer 204 should assess other potential installation points (block 338). If other potential installation points are to be assessed by the analyzer 204, the analyzer 204 continues and identifies one or more other potential installation points (block 328).

If the situational assessment module 118 determines that no other installation points will be assessed by the analyzer (block 338), the situational assessment module 118 reassess the effort (block 340). For example, the drone 100 may be partially embedded in the roof but the installation was not deemed stable. The drone 100 may be irretrievably coupled to the roof and/or damaged. In this example, the situational assessment module 118 may reassess the effort (block 340) and determine that the rescue mission should end. In another example, the situational assessment module 118 can reassess the effort (block 340) and determine that additional securing devices 122 should be deployed to shore up the stability of the installation point. In another example, the situational assessment module 118 may reassess the effort (block 340) and determine that coordination with one or more other drones can accomplish the desired rescue or aid delivery.

If the situational assessment module 118 determine that the drone 100 itself cannot be used as the stable site (block 326), the situational assessment module 118 determines if the drone 100 has payload 124 that can be dropped (block 342). For example, a drone 100 dispatched for a recuse mission over water may not anchor to any structure or use the drone as a stable site but, rather, is sent to provide a life raft to a victim. In this example, when the situational assessment module 118 determines that the drone has safety equipment, rescue equipment, and/or other payload 124 that can be dropped, the situational assessment module 118 sends an instructional signal to the actuator 120 via the actuator interface 208 to deploy safety and/or rescue equipment and/or other payload 124 (block 320).

If the situational assessment module 118 determines that the drone 100 does not have a payload 124 that can be dropped (block 342), the situational assessment module 118 reassesses the effort (block 340) as disclosed above, for example.

FIG. 4 is a block diagram of an example processor platform 400 capable of executing the instructions of FIGS. 3A and 3B to implement the apparatus of FIGS. 1 and 2. The processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer. The hardware processor may be a semiconductor based (e.g., silicon based) device. In this example, the processor implements the example motor controller 110, the example actuator 120, the example sensor interfaces 202, the example analyzer 204, the example person identification unit 205, the example structural integrity identification unit 207, the actuator interfaces 208, and/or the example situational assessment module 118 of FIG. 2.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

The coded instructions 432 of FIG. 4 may be stored in the mass storage device 428, in the volatile memory 414, in the non-volatile memory 416, and/or on a removable tangible computer readable storage medium such as a CD or DVD.

From the foregoing, it will be appreciated that example methods, apparatus and articles of manufacture have been disclosed that advance operations of drones in emergency situations. The drones disclosed herein provide low-latency, high accuracy response to provide safety equipment and/or other types of rescue equipment to victims. The speed and accuracy of the deployed drones enhances human safety. The autonomous discernment of victims and potential anchor sites and installation points and the use of the drone itself as its own securing mechanism or stable site advance the capabilities of current drones and improve the use of drones in emergency response situations.

Example methods, apparatus, systems and articles of manufacture for drone operation are disclosed herein. Different aspects of the examples disclosed herein can be combined in other examples. Further examples and combinations thereof include the following.

Example 1 is an apparatus to deploy safety equipment. In this example, the apparatus includes a sensor to gather environmental data and an analyzer in communication with the sensor. The analyzer is to identify an anchor site based on the environmental data and to produce an assessment of stability of the anchor site based on the environmental data and model data. The apparatus in this example also includes one or more actuators to deploy a securing device in response to the assessment of the analyzer indicating the anchor site is stable and to deploy the safety equipment.

Example 2 includes the apparatus of Example 1, wherein the one or more actuators is to deploy the securing device from a drone.

Example 3 includes the apparatus of Example 1, wherein analyzer is to identify an installation point based on the environmental data and the model data.

Example 4 includes the apparatus of Example 3, wherein the analyzer is to identify the installation point when the anchor site is unstable.

Example 5 includes the apparatus of Example 3, wherein the analyzer is to install a drone at the installation point.

Example 6 includes the apparatus of Example 4, wherein the analyzer is to identify the installation point further based on one or more of a physical property of the drone or an operational history of the drone.

Example 7 includes the apparatus of any of Examples 1-6, wherein the anchor site is one of a plurality of potential anchor sites and the analyzer is to detect a person based on the environmental data and eliminate the person as a potential anchor site.

Example 8 includes the apparatus of any of Examples 1-6, wherein the apparatus is included in a first drone, and the apparatus includes a transmitter to communicate with a second drone, the actuator to deploy the safety equipment in coordination with the second drone.

Example 9 includes the apparatus of any of Examples 1-6, wherein the environmental data includes movement data.

Example 10 includes the apparatus of any of Examples 1-6, wherein the environmental data includes thermal imaging or electromagnetic radiation data.

Example 11 includes the apparatus of any of Examples 1-6, wherein the model data includes a mechanical property of a building material.

Example 12 is a drone that includes means to gather environmental data. The example drone also includes means to identify an anchor site based on the environmental data and assess stability of the anchor site based on the environmental data and model data. In addition, the example drone includes means to deploy a securing device when the anchor site is stable and to deploy the safety equipment.

Example 13 includes the drone of Example 12, wherein the means to identify further is to identify an installation point based on the environmental data and the model data.

Example 14 includes the drone of Example 13, wherein the means to identify is to identify the installation point when the anchor site is unstable.

Example 15 includes the drone of Example 13, wherein the means to identify is to identify the installation point further based on one or more of a physical property of the drone or an operational history of the drone.

Example 16 includes the drone of any of Examples 12-15, wherein the anchor site is one of a plurality of potential anchor sites and the analyzer is to detect a person based on the environmental data and eliminate the person as a potential anchor site.

Example 17 includes the drone of any of Examples 12-15, wherein the drone is a first drone and further includes means to communicate with a second drone, wherein the means to deploy is to deploy the safety equipment in coordination with the second drone.

Example 18 includes the drone of any of Examples 12-15, wherein the environmental data includes movement data.

Example 19 includes the drone of any of Examples 12-15, wherein the environmental data includes thermal imaging or electromagnetic radiation data.

Example 20 includes the drone of any of Examples 12-15, wherein the model data includes a mechanical property of a building material.

Example 21 is a non-transitory computer readable storage medium including computer readable instructions that, when executed, cause one or more processors to at least access environmental data and model data and identify an anchor site based on the environmental data. The example instructions also cause the one or more processors to produce an assessment stability of the anchor site based on the environmental data and model data, control deployment of a securing device in response to the assessment indicating that the anchor site is stable, and control deployment of safety equipment once the securing device is secured to the anchor site.

Example 22 includes the computer readable storage medium of Example 21, wherein the instructions, when executed, cause the securing device to be deployed from a drone.

Example 23 includes the computer readable storage medium of Example 21, wherein the drone is a first drone, and the instructions, when executed, cause the drone to communicate with a second drone and control the deployment of the safety equipment in coordination with the second drone.

Example 24 includes the computer readable storage medium of Example 21, wherein instructions, when executed, cause the one or more processors to identify an installation point based on the environmental data and the model data.

Example 25 includes the computer readable storage medium of Example 24, wherein the instructions, when executed, cause the one or more processors to identify the installation point when the anchor site is unstable.

Example 26 includes the computer readable storage medium of Example 24, wherein the instructions, when executed, cause the one or more processors to control installment of a drone at the installation point.

Example 27 includes the computer readable storage medium of Example 26, wherein the instructions, when executed, cause the one or more processors to identify the installation point further based on one or more of a physical property of the drone or an operational history of the drone.

Example 28 includes the computer readable storage medium of any of Examples 21-27, wherein the anchor site is one of a plurality of potential anchor sites and the instructions, when executed, cause the one or more processors to detect a person based on the environmental data and eliminate the person as a potential anchor site.

Example 29 includes the computer readable storage medium of any of Examples 21-27, wherein the environmental data includes movement data.

Example 30 includes the computer readable storage medium of any of Examples 21-27, wherein the environmental data includes thermal imaging or electromagnetic radiation data.

Example 31 includes the computer readable storage medium of any of Examples 21-27, wherein the model data includes a mechanical property of a building material.

Example 32 is a method to deploy safety equipment. The example method includes identifying, by executing an instruction with a processor, an anchor site based on environmental data and assessing, by executing an instruction with a processor, stability of the anchor site based on the environmental data and model data. The example method also includes controlling, by executing an instruction with a processor, deployment of a securing device when the anchor site is stable and controlling, by executing an instruction with the processor, deployment of the safety equipment.

Example 33 includes the method of Example 32, wherein deployment of the securing device includes deployment of the securing device from a drone.

Example 34 includes the method of Example 33, wherein the drone is a first drone, and the method further includes communicating, by executing an instruction with a processor, with a second drone and controlling, by executing instructions with a processor, deployment of the safety equipment in coordination with the second drone.

Example 35 includes the method of Example 32, further including identifying, by executing instructions with a processor, an installation point based on the environmental data and the model data.

Example 36 includes the method of Example 35, wherein the installation point is to be identified when the anchor site is unstable.

Example 37 includes the method of Example 35, further including controlling the installation of a drone at the installation point.

Example 38 includes the method of Example 37, further including identifying the installation point further based on one or more of a physical property of the drone or an operational history of the drone.

Example 39 includes the method of any of Examples 32-38, wherein the anchor site is one of a plurality of potential anchor sites and the method further includes detecting, by executing an instruction with a processor, a person based on the environmental data and eliminating, by executing an instruction with a processor, the person as a potential anchor site.

Example 40 includes the method of any of Examples 32-38, wherein the environmental data includes movement data.

Example 41 includes the method of any of Examples 32-38, wherein the environmental data includes thermal imaging and electromagnetic radiation data.

Example 42 includes the method of any of Examples 32-38, wherein the model data includes a mechanical property of a building material.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to deploy safety equipment, the apparatus comprising:
   a sensor to gather environmental data;
   an analyzer in communication with the sensor, the analyzer to:
     identify an anchor site based on the environmental data; and
     produce an assessment of stability of the anchor site based on the environmental data and model data; and
   one or more actuators to deploy a securing device in response to the assessment of the analyzer indicating the anchor site is stable and to deploy the safety equipment.

2. The apparatus of claim 1, wherein the one or more actuators is to deploy the securing device from a drone.

3. The apparatus of claim 1, wherein the analyzer is to identify an installation point based on the environmental data and the model data.

4. The apparatus of claim 3, wherein the analyzer is to identify the installation point when the anchor site is unstable.

5. The apparatus of claim 3, wherein the analyzer is to install a drone at the installation point.

6. The apparatus of claim 4, wherein the analyzer is to identify the installation point further based on one or more of a physical property of the drone or an operational history of the drone.

7. The apparatus of claim 1, wherein the anchor site is one of a plurality of potential anchor sites and the analyzer is to detect a person based on the environmental data and eliminate the person as a potential anchor site.

8. The apparatus of claim 1, wherein the apparatus is included in a first drone, and the apparatus includes a transmitter to communicate with a second drone, the actuator to deploy the safety equipment in coordination with the second drone.

9. The apparatus of claim 1, wherein the environmental data includes movement data.

10. The apparatus of claim 1, wherein the environmental data includes thermal imaging or electromagnetic radiation data.

11. The apparatus of claim 1, wherein the model data includes a mechanical property of a building material.

12. A drone, comprising:
means for gathering environmental data;
means for identifying an anchor site based on the environmental data and for assessing stability of the anchor site based on the environmental data and model data; and
means for deploying a securing device when the anchor site is stable, the means for deploying to deploy safety equipment.

13. The drone of claim 12, wherein the means for identifying is to identify an installation point based on the environmental data and the model data.

14. The drone of claim 13, wherein the means for identifying is to identify the installation point when the anchor site is unstable.

15. The drone of claim 13, wherein the means for identifying is to identify the installation point based on one or more of a physical property of the drone or an operational history of the drone.

16. The drone of claim 12, wherein the anchor site is one of a plurality of potential anchor sites and the means for identifying is to detect a person based on the environmental data and eliminate the person as a potential anchor site.

17. The drone of claim 12, wherein the drone is a first drone, the first drone further including means for communicating with a second drone, the means for deploying to deploy the safety equipment in coordination with the second drone.

18. A non-transitory computer readable storage medium comprising computer readable instructions that, when executed, cause one or more processors to at least:
access environmental data and model data;
identify an anchor site based on the environmental data;
produce an assessment stability of the anchor site based on the environmental data and model data;
control deployment of a securing device in response to the assessment indicating that the anchor site is stable; and
control deployment of safety equipment once the securing device is secured to the anchor site.

19. The computer readable storage medium of claim 18, wherein the instructions, when executed, cause the securing device to be deployed from a drone.

20. The computer readable storage medium of claim 19, wherein the instructions, when executed, cause the one or more processors to identify an installation point of the drone based on the environmental data and the model data.

21. The computer readable storage medium of claim 20, wherein the instructions, when executed, cause the one or more processors to identify the installation point when the anchor site is unstable.

22. The computer readable storage medium of claim 20, wherein the instructions, when executed, cause the one or more processors to identify the installation point based on one or more of a physical property of the drone or an operational history of the drone.

23. The computer readable storage medium of claim 18, wherein the anchor site is one of a plurality of potential anchor sites and the instructions, when executed, cause the one or more processors to detect a person based on the environmental data and eliminate the person as a potential anchor site.

24. A method to deploy safety equipment, the method comprising:
identifying, by executing an instruction with at least one processor, an anchor site based on environmental data;
assessing, by executing an instruction with the at least one processor, stability of the anchor site based on the environmental data and model data;
controlling, by executing an instruction with the at least one processor, deployment of a securing device when the anchor site is stable; and
controlling, by executing an instruction with the processor, deployment of safety equipment.

25. The method of claim 24, wherein the deployment of the securing device includes deployment of the securing device from a drone.

* * * * *